United States Patent
Schecter (10) Patent No.: US 6,598,277 B1
(45) Date of Patent: Jul. 29, 2003

(54) GEMSTONE RETENTION BY USE OF CONTROLLABLE SETTING FORCE

(76) Inventor: Joel Schecter, 42 Rodman Ave., Havertown, PA (US) 19083

( * ) Notice: Subject to any disclaimer, the term of this patent is extended or adjusted under 35 U.S.C. 154(b) by 0 days.

(21) Appl. No.: 10/144,182

(22) Filed: May 13, 2002

(51) Int. Cl.[7] ................................................. B23P 5/00
(52) U.S. Cl. .................................. 29/10; 63/26; 63/27
(58) Field of Search ..................... 29/10, 896.4, 896.41, 29/896.411, 896.412; 63/26, 27

(56) References Cited

U.S. PATENT DOCUMENTS

| | | | |
|---|---|---|---|
| 608,362 A | * 8/1898 | Dover | |
| 717,824 A | * 1/1903 | Dover | |
| 722,824 A | * 3/1903 | Dover | |
| 1,385,702 A | * 7/1921 | Mountford | |
| 3,839,770 A | * 10/1974 | Favre | |
| 4,258,458 A | 3/1981 | Danna | 29/10 |
| 4,750,245 A | 6/1988 | Moussouris | 29/10 |
| 4,793,156 A | 12/1988 | Pence | 63/26 |
| 5,475,910 A | 12/1995 | Yamamoto | 29/10 |
| 5,671,613 A | 9/1997 | Hoover et al. | 63/27 |
| 5,800,574 A | 9/1998 | Ricci et al. | 29/10 |
| 5,855,048 A | 1/1999 | Synowicki et al. | 29/10 |
| D411,134 S | 6/1999 | Lai | D11/92 |
| 6,038,751 A | 3/2000 | Butler | 29/10 |
| D430,061 S | 8/2000 | Chan | D11/92 |
| D432,448 S | 10/2000 | Lai | D11/92 |
| D434,694 S | 12/2000 | Lai | D11/92 |
| D439,191 S | 3/2001 | Wolf | D11/26 |
| RE37,189 E | 5/2001 | Lai | D11/91 |
| 6,260,384 B1 | 7/2001 | Mino et al. | 63/26 |

* cited by examiner

Primary Examiner—P. W. Echols
(74) Attorney, Agent, or Firm—Law Offices of John A. Parrish (57) ABSTRACT

Setting of gems is accomplished by applying torque to flanges which extend from prongs that hold the gem in the setting. The flanges form integral lever extensions to provide a secure handle by which a force or torque can be applied without the risk of slipping and damaging the setting or gemstone. Notches or bendable sections of the prongs are located at grip locations and when the prongs engage the gemstone, the prong bends about the bendable section to secure the gem. To set a gem, the worker applies a clamping tool to individual ones of the levers, which results in the prong bending inward and gently twisting over the gemstone in a controlled manner. This allows the worker to control the pressure applied to the stone by the prong, thus limiting breakage of the gem. The levers are then removed from each prong by cutting and/or grinding, and the surface of each prong is then polished. The present invention also allows a significantly heavier prong profile to be used, resulting in a tighter and more durable setting.

6 Claims, 6 Drawing Sheets

GEMSTONE RETENTION BY USE OF CONTROLLABLE SETTING FORCE

FIELD OF THE INVENTION

This invention relates to jewelry settings of the prong type. More specifically, the invention relates to an arrangement for setting a gemstone in a prong type setting and to the finishing of the setting.

DISCUSSION OF RELATED ART

One popular method of setting gemstones in jewelry is to provide prongs which support the stone by means of notches in the prongs. The stone is supported at an outer periphery by the prongs, which has the advantage of displaying a large proportion of the gemstone. This arrangement is particularly popular for jewelry which displays precious or semiprecious stones, although the technique can be used for displaying rhinestones and non-precious decorative items.

In such setting of gems for jewelry, a set of prongs are provided. The gem setter uses a pliers to bend or twist the prongs of the setting into place to hold a gem. In inserting a stone into such a support, the support is typically expanded to accept the stone and then compressed over the stone. The pliers sometimes scratch the surface of the prong, requiring the prong to be re-polished. The amount of force needed to effect precisely the desired amount of plastic distortion of the prongs is often difficult to gauge, resulting in unstable settings.

A common occurrence is the gem setter pushing too hard on the pliers, or allowing the pliers to slip, in either case causing the gem to fracture.

One type of prior art setting is exemplified by the Tru-Seat setting, e.g., as described in U.S. Pat. No. 5,671,613. Such an arrangement is helpful for round gems but not as much for odd-shaped ones.

Alternatively in the prior art, the gem setter uses a pliers to twist the prongs of the setting into place to hold a gem. It is noted that the pliers would sometimes scratch the surface of the prong, requiring the prong to be re-polished.

U.S. Pat. No. 5,800,574, to Ricci, et al., a setting and a method of making a setting that includes a V-end prong member having two V-shaped prongs preferably fabricated from a single length of material such as, for example, a round wire. Two grooves are die-struck into the length of material and extend from a center portion of the length of material toward opposite ends thereof. The length of material is blanked so as to trim excess material therefrom, forming a blank having opposite, receptacle-defining end portions, and a central portion. The blank is then bent so that the receptacles face each other to define the V-end prong member having two V-shaped end prongs and a central portion. A conventional prong member can then be attached to the central portion of the V-end prong member. The prong member includes spaced distal ends that confine the article between the spaced distal ends and the receptacles.

U.S. Pat. No. 6,038,751, to Butler shows a jewelry setting for accommodating stones of various sizes, having two or more substantially straight prongs. Each prong is angularly directed from a common location in a base. To set the stone, the worker seats the stone at a height above the base without adjusting the angular direction of the prongs. The worker then shaves the distal ends of the prongs, such that the prongs do not extend substantially past the height of the seated gem. The shaving can be done by using a tool, such as a bearing cutter. In that arrangement, each prong is formed with an inwardly directed notch formed adjacent the distal ends of the prongs, this being accomplished after the prongs are shaved to an appropriate size. This patent does not suggest applying torque to the arms, and teaches shaving the arms before even the notches are formed. The setting entirely omits any horizontal element, such as a crossbar. This omission would make the setting less stable if one were to exert a torque on any of the prongs to twist them inwardly over the edge of a gemstone.

U.S. Pat. No. 4,750,245, to Moussoris describes an apparatus for mounting gemstones in prong-type settings by cutting a seat in the form of an inset edge in the ends of the prongs and swaging the remaining prong material over a stone girdle. A vertical support frame holds a tool driver such as a rotating chuck assembly slidably mounted thereon. A swaging element, which is removably coupled with the tool driver, contacts the ends of setting prongs after being cut. The swaging element bends a portion of the prong ends over the girdle of the stone. A micrometer is used to facilitate the swaging operation. The swage socket has a hemispherical opening which contacts the prongs of the setting. As the prongs engage the outer portion of the opening 148 they are slowly deflected inward toward the center of the stone, thus folding over the edge of the stone girdle. In this manner, the entire prong is bent.

In U.S. Pat. No. 5,855,048, to Synowicki, et al., a tool is used for mounting a solitaire gemstone in the head of a ring or earring. The tool holds a jewelry setting at the base.

In U.S. Pat. No. 5,800,574, to Ricci, et al., a setting includes a V-end prong member having two V-shaped prongs preferably fabricated from a single length of material such as, for example, a round wire. Two grooves are die-struck into the length of material and extend from a center portion of the length of material toward opposite ends thereof. The length of material is blanked so as to trim excess material therefrom, forming a blank having opposite, receptacle-defining end portions, and a central portion. The blank is then bent so that the receptacles face each other to define the V-end prong member having two V-shaped end prongs and a central portion. A conventional prong member can then be attached to the central portion of the V-end prong member. The prong member includes spaced distal ends that confine the article between the spaced distal ends and the receptacles. The gemstone is set using prongs formed of sheets of metal having a V-shaped cross section.

It is desired to provide a setting which can be assembled easily and with reduced incidence of gemstone breakage. In doing so, it is desired to control an amount of force applied to the setting so as to transfer a desired amount of force. The force should be sufficient to assure secure retention of the gemstone by the setting, but low enough to minimize breakage. It is desired to provide a method for applying precisely controlled amounts of force to prongs in a prong setting. In particular, since a prong setting is normally adjusted by bending at a base of the prongs or just above a lateral support for the prongs, it is desired to control an amount of torque applied to the prongs.

When using tools to apply torque to prongs, another form of damage which can occur is gouging or spalling of the prongs. Standard practice is to apply pressure with a pliers or a similar clamping tool which is intended to limit damage to the prongs, and if damage occurs, attempt to polish the damaged area sufficiently to remove the marks. The use of tools also tends to result in the prongs shifting in undesired directions. This distorts the shape of the setting, weakens the setting's grip on the gemstone and weakens the prongs. Nevertheless, gemstones are commonly set manually, meaning without precision torque control apparatus. It is therefore desired to provide an ability to easily set a gemstone in a prong setting with sufficient force to secure the stone, without unduly stressing the stone. It is further desired to accomplish this in a manner which does not result in marring the final product. In addition, it is desired to provide a heavier or sturdier prong setting so that the stone is more securely mounted.

SUMMARY OF THE INVENTION

The present invention provides an improved method and apparatus for setting gems, e.g. for use in a gold or other precious metal ring or brooch. According to one aspect of the present invention, extended ends on a plurality of prongs perform a lever arm function, which facilitates bending the prongs. Bending of the prongs in accordance herewith results in the prongs securely engaging against the gemstone with reduced tendency to fracture the gemstone.

According to an optional aspect of the present invention, the prongs are reinforced to provide stability. In one configuration, a horizontal element, such as a crossbar is provided. The use of reinforcement enhances stability of the prongs. This is beneficial when a torque is exerted on any of the extended ends, for example to twist them inwardly over the edge of a gemstone.

In the present invention, prongs that hold the gem in the setting are cast or struck with a lever arm in the form of a flange extending therefrom. The flange provides a lever extension to the prong, and is used to manipulate the end of the prong. This integral lever extension provides a secure handle by which a force or torque can be applied without the risk of slipping and damaging the setting or gemstone.

To set a gem, the worker positions a gem into place. The worker then applies a clamping tool or wrench to an individual one of the levers, and the force performs a lever function to gently twist the end of the lever arm into place in a controlled manner. The prongs engage the gemstone at a girdle location on the gemstone, at which time the prongs deform at the notches. In one embodiment the tool may be controlled by hand feel. In another embodiment the tool may include a torque-measuring or torque-limiting device to control the pressure applied to the stone by the prong, thus minimizing likelihood of breaking the gem. The worker then applies the tool successively to other levers as needed to gently move the prongs in a controlled manner into place until the gem is securely mounted. The levers are then removed from each prong by cutting and/or grinding them away, and the surface of each prong is then polished.

The invention provides an improved technique for setting gems. A gem setting includes at least one prong. The prong(s) have an indent positioned at an upper distal end functioning to hold a edge of a gem or "girdle." In one particular configuration, the prong(s) have a V-shaped indent. A lever extension extends upwardly from each of the prongs.

In an optional aspect of the invention, a cross member positioned at lower end securely connects the prongs.

After the gemstone is set, the extended ends of the prongs are cut off to leave exposed ends, and the exposed ends are polished.

An advantage of the present invention is that a significantly heavier prong may be used, thereby providing a tighter and more durable setting. In particular, the notched portion of the prong at the girdle can be made significantly heavier. Therefore a heavier prong profile to be used, resulting in a tighter and more durable setting.

According to one aspect of the present invention, a gemstone setting can be assembled easily and with reduced incidence of gemstone breakage. In setting the gemstone, a controlled amount of force is applied to the setting so as to transfer a desired amount of force. The force is sufficient to assure secure retention of the gemstone by the setting, but low enough to minimize breakage. Precisely controlled amounts of force are applied to prongs in a prong setting. In particular, a controlled amount of torque is applied to the prongs of a prong setting, thereby allowing adjustment by bending the prongs at a base of the prongs or just above a lateral support for the prongs, as well as bending the prongs over the gemstone.

The invention permits application of pressure using hand feel. This is done with a clamping tool, and results in a very controlled application of force. The invention permits the use of tools with a reduced tendency of causing the prongs to shift in undesired directions. This avoids distorting the shape of the setting, and assures that the setting has a strong grip on the gemstone without weakening the prongs. The invention provides an ability to easily set a gemstone in a prong setting with sufficient force to secure the stone, without unduly stressing the stone. This is achieved in a manner which does not result in marring the final product. The invention also facilitates providing a heavier or sturdier prong setting so that the stone is more securely mounted.

DETAILED DESCRIPTION OF EXEMPLARY EMBODIMENTS

Figure 1:
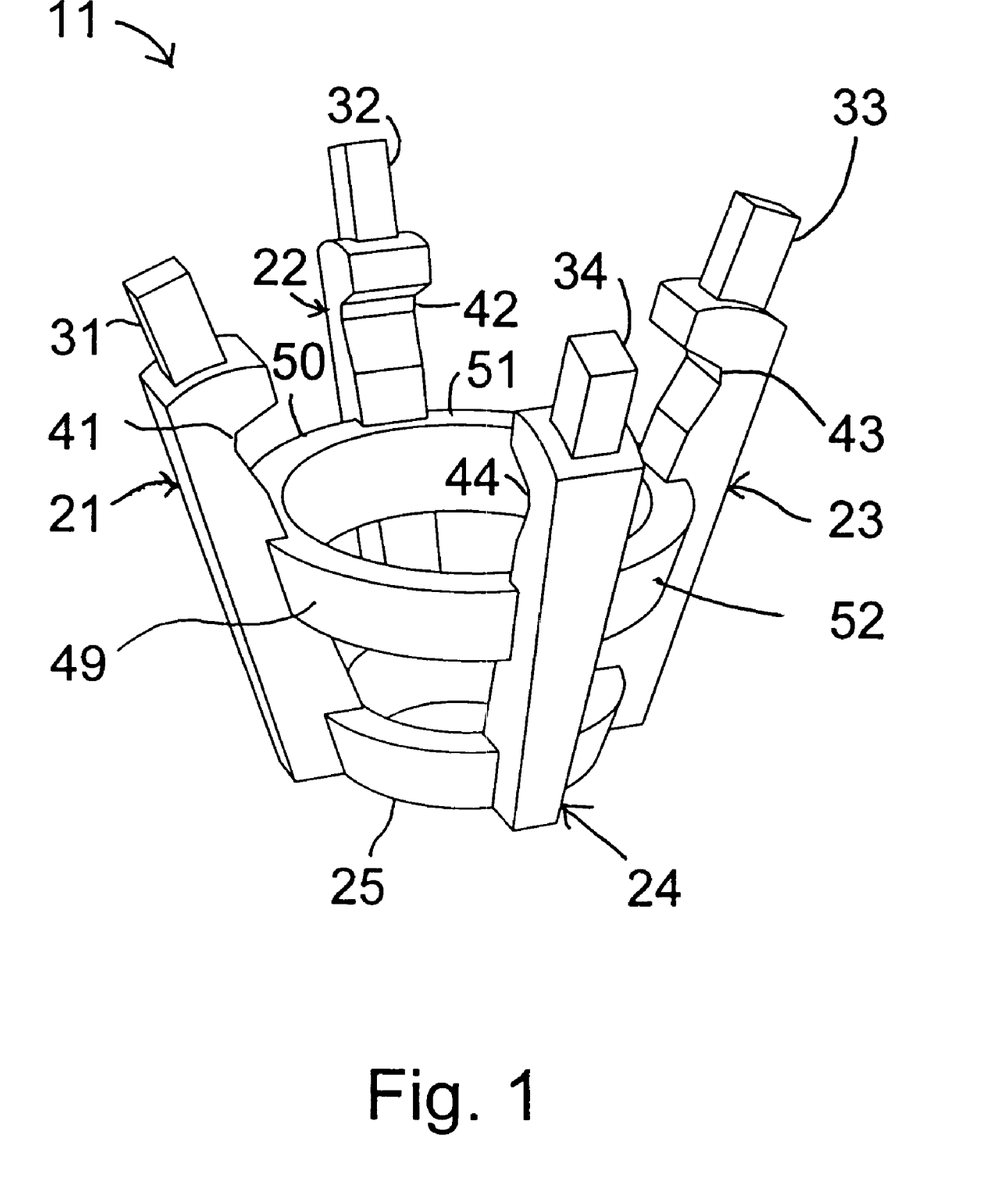
FIG. 1 is a perspective view of a setting constructed in accordance with one aspect of the present invention.

FIG. 1 is a perspective view of a setting 11 constructed in accordance with one aspect of the present invention. The particular ornamental design of the setting 11 can vary, and so particular ornamental features are anticipated to be different from those depicted.

As can be seen, a plurality of prongs 21–24 extend from a base 25. The prongs 21–24 each have free end extensions 31–34. On inside surfaces of the prongs 21–24 near the free end extensions 31–34 are notches 41–44. The base 25 provides support for the prongs 21–24, so that in a rigid state, the relative locations the prongs 21–24 as well as the free end extensions 31–34 and the notches 41–44 are fixed. Reinforcements 49–52 extend between the prongs 21–24 and are attached to the prongs 21–24 above the base 25.

Figure 2:
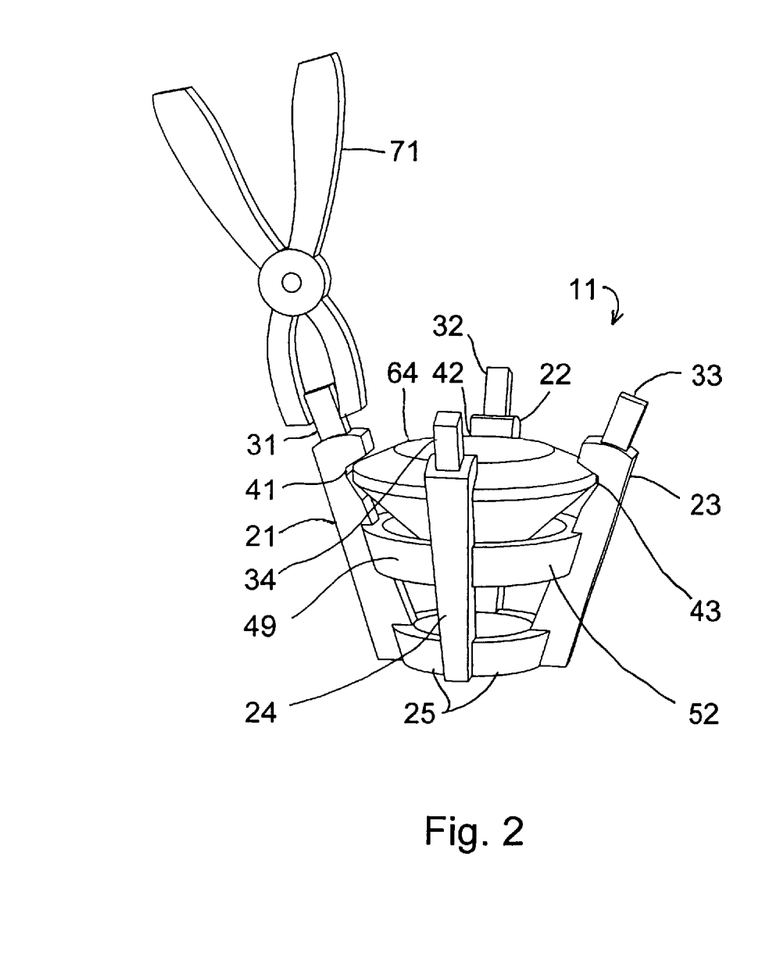
FIG. 2 is a perspective view of the setting of FIG. 1, showing a tool being used to apply torque to bend the prong according to one aspect of the present invention.

The notches 41–44 are intended to receive a gemstone 64 as shown in FIG. 2. As can be seen in FIG. 1, the end extensions 31–34 are furthest from the base 25 and the reinforcements 49–52. This establishes a moment from the end extensions 31–34 which is greater than at the notches 41–44. The notches 41–44 form a section of the prong 21–24 having a reduced yield strength. The notches 41–44 also form a grip for the gemstone.

Referring to FIG. 2, the gemstone 64 is received by the setting 11 and is approximately lined up with the notches 41–44. A bending tool 71 is used to grab at individual ones of the end extensions 31–34. In order to seat the prongs 21–24 against the gemstone, the tool 71 is used to bring individual ones of the prongs 21–24 into engagement against the gemstone 64. This exerts a torque on the prong 21–24 as a result of force transferred from the tool 71 to the end extension 31–34 of that prong 21–24 (shown with extension 31 on prong 21). The force at the end extension 31–34 has its greatest moment at the base 25, although the reinforcements 49 (reinforcement 49 shown in FIG. 2) counter this moment.

The prongs 21–24 are cantilevered above the reinforcements 49–52, and so the torque exerted by the tool 71 bends the prong 21–24. As a result of the prongs 21–24 being cantilevered at the reinforcements, the maximum bending force occurs just above the reinforcements 49–52 if the prongs 21–24 are generally uniform in thickness.

The bending of the prongs 21–24 causes the prongs 21–24 to engage the gemstone 64 at the notches 41–44. With the prongs 21–24 engaging the gemstone 64 at the notches 41–44, the gemstone 64 is now supporting the prongs 21–24 against the force exerted by the tool 71. The notches 41–44 represent a reduced cross-sectional area of the respective prongs 21–24 and therefore have an increased tendency to yield. This results in a lower yield strength at the notches 41–44 than the part of the prongs 21–24 just above or below the notches 41–44. In addition, because the prongs 21–24 are supported at the notches 41–44 against the gemstone 64, the force at the end extensions 31–34 now has its greatest moment at the notches 41–44. The notches 41–44 are intentionally caused to yield to plastic deformation of the material of the prongs 21–24. This results in the prongs 21–24 bending about the gemstone 64 at the notches 41–44.

The resting of the notches 41–44 against the gemstone results in the gemstone blocking further movement of the prong 21–24 below the notches 41–44, and the bending of the prong 21–24 about the notches 41–44. This further secures the prong 21–24 about the gemstone 64. The notches 41–44 form a section of the prong 21–24 having a reduced yield strength. The notches 41–44 also form a grip for the gemstone 64. The gripping of the gemstone is accomplished by clamping at least one of the prongs 21, at the extension 31, thereby causing the clamped prongs to bend about the section of the prong having the reduced yield strength, which is the notch 41. This secures the gemstone 64 in the setting 11, and the extension 31 can then be removed from the setting 11 after said forcing the prong 21.

In some cases there will be a substantial amount of movement for the prongs 21–24 to engage the gemstone 64. If desired, the tool 71 or a different tool (not shown) may be used to grab at least one of the end extensions 31–34 to initially bring the extensions 31–34 together prior to finally seating the prongs 21–24. In this way pairs of prongs, such as prongs 21, 23 will be clamped together. It is also possible to achieve the seating in a setting of the type which has only a single prong (not shown).

Figure 2A:
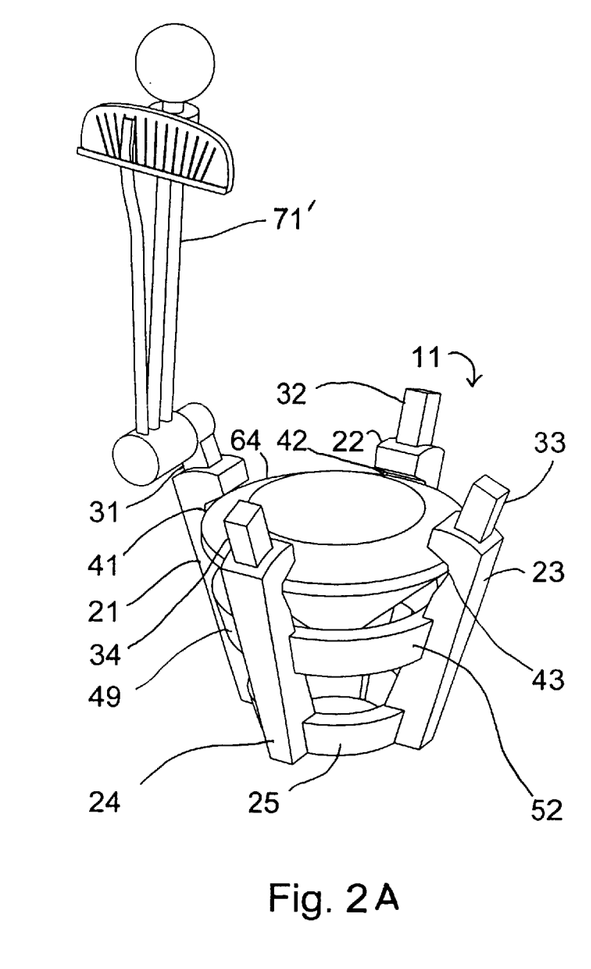
FIG. 2A is a perspective view of the setting of FIG. 1, showing a torque wrench used to apply torque to bend the prongs according to another aspect of the present invention.

FIG. 2A is a perspective view of the setting of FIG. 1, showing a torque wrench 71' used instead as the tool to apply torque to bend the prongs. The torque wrench 71' may be of any conventional design, including the "detent click" type. If desired, the tool may be designed especially to fit the extensions 31–34, regardless of whether torque measurements are used.

Figure 3:
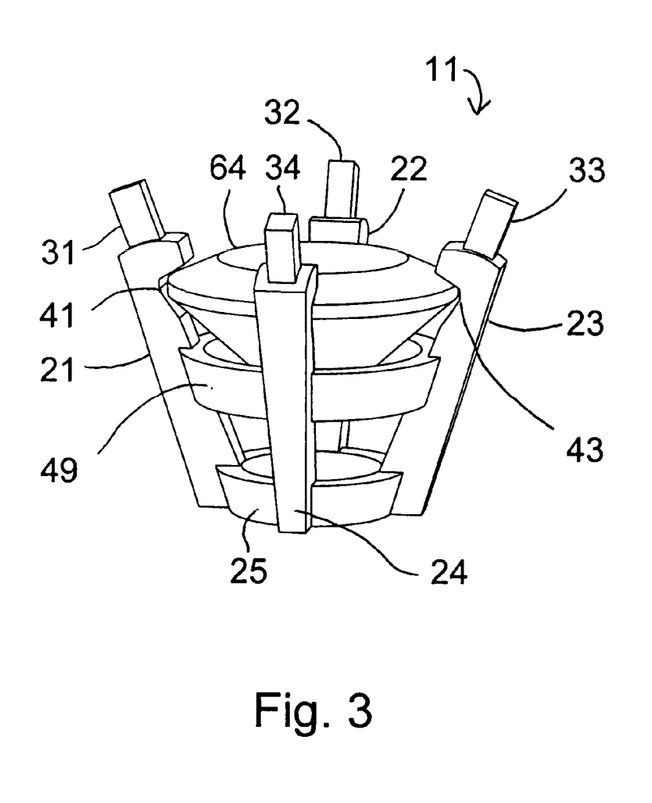
FIG. 3 is a perspective view of the setting of FIG. 1, with a gemstone set in the setting.

In all of this movement, the prongs 21–24 are secured about the gemstone 64 in a controlled manner. This is normally accomplished by hand operation, but it is possible to accomplish this work in a controlled manner so as not to apply so much force as to fracture the gemstone. FIG. 3 is a perspective view of the setting of FIG. 1, with the gemstone 64 set in the setting 11 and retained by the prongs 21–24, which are bent about the notches 41–44 (notches 41 and 43 shown in FIG. 3).

Figure 4:
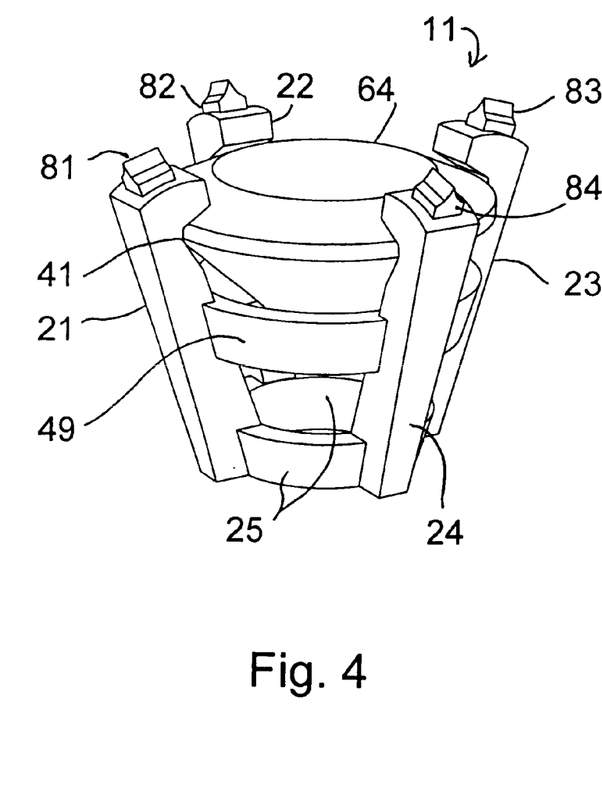
FIG. 4 is a perspective view of the setting, after prong extensions are cut in accordance with the present invention.
Figure 5:
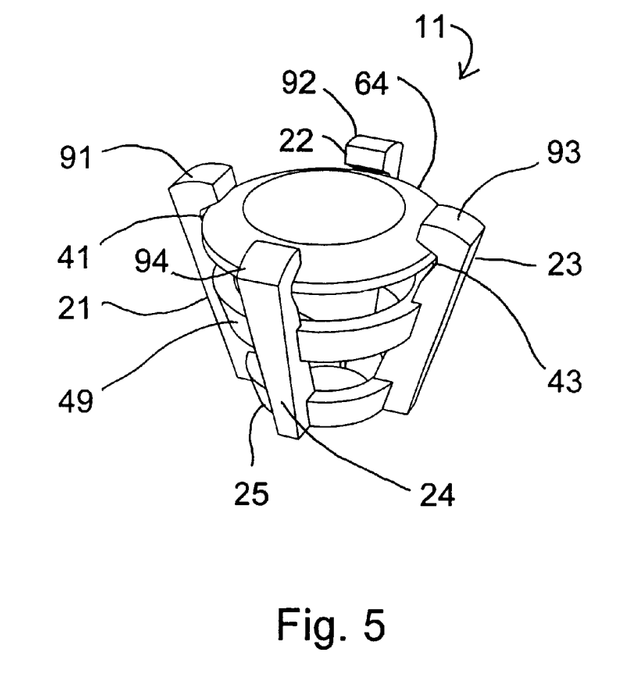
FIG. 5 is a perspective view of the setting of FIG. 4, after polishing of the prong ends.

After the bending of the prongs 21–24, the end extensions 31–34 are cut off, as shown in FIG. 4. The end extensions 31–34 may be cut with or without the tools 71–74 engaging the end extensions 31–34. This leaves "raw" ends 81–84 on the prongs 21, as shown in FIG. 4. The raw ends are then polished or otherwise finished to result in smooth ends 91–94 as shown in FIG. 5. FIG. 5 is a perspective view of the setting of FIG. 4, after polishing of the prong ends.

Thus, as shown in FIGS. 1, 2 and 2A, the prongs 21–24 that hold the gem 64 in the setting are fabricated with a lever arm in the form of an extension 31–34 or flange extending from the base 25. This integral lever extension 31–34 provides a secure handle by which a force or torque can be applied without the risk of slipping and damaging the setting 11 or gemstone 64.

The fabrication may be accomplished by a number of techniques. This includes die striking or blanking followed by assembly, by casting, or any other convenient method. In typical configurations, 4, 6 and 8 prongs are provided, although there may alternatively be 2-prong settings or 3-prong settings, or other numbers of prongs. The precise number of prongs is largely one of design choice. The fabricated setting may have a tapered profile, so that the base of each prong 21–24 is wider than the top of the prong. This makes it more difficult to move the prong about the base.

To set a gem 64, the worker inserts the gem 64 into place. The worker then applies a tool 71 to one or more of the prongs 21–24 at its extension 31–34. Using the tool, the worker gently and in a controlled manner twists the prong 21–24 into place. The tool 71 may be a torque-measuring or torque-limiting device to control the pressure applied to the stone by the prong 21–24, thus limiting breakage of the gem 64. The worker then applies the torque to another of the extensions 31–34 and gently twists it in controlled manner into place, and so on, until the gem is securely mounted.

The extensions 31–34 are then removed from each prong 21–24 by cutting and/or grinding them away, and the surface of each prong 21–24 is then polished to provide the smooth ends 81–84 shown in FIG. 5.

Figure 6:
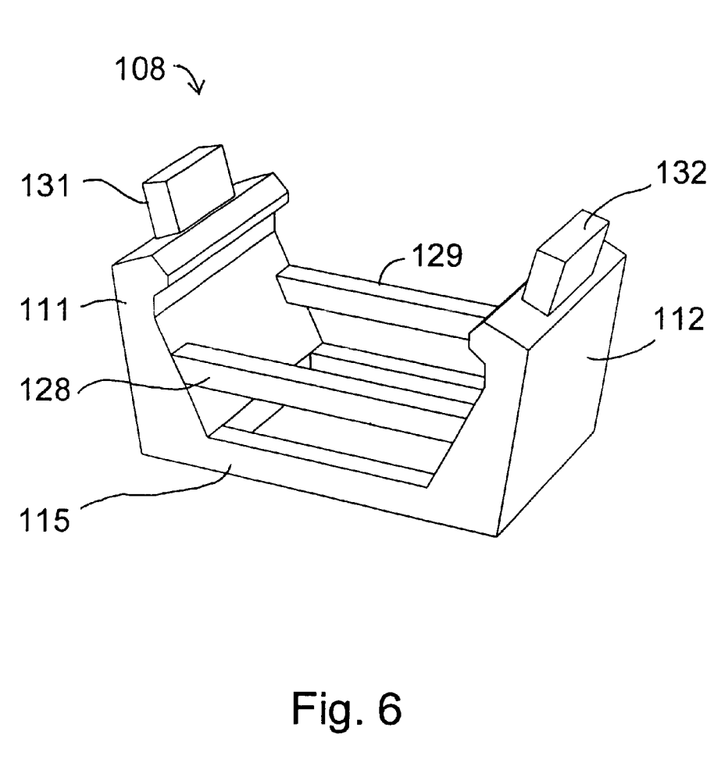
FIG. 6 is a perspective view of a setting constructed in accordance with an alternate aspect of the present invention.
Figure 7:
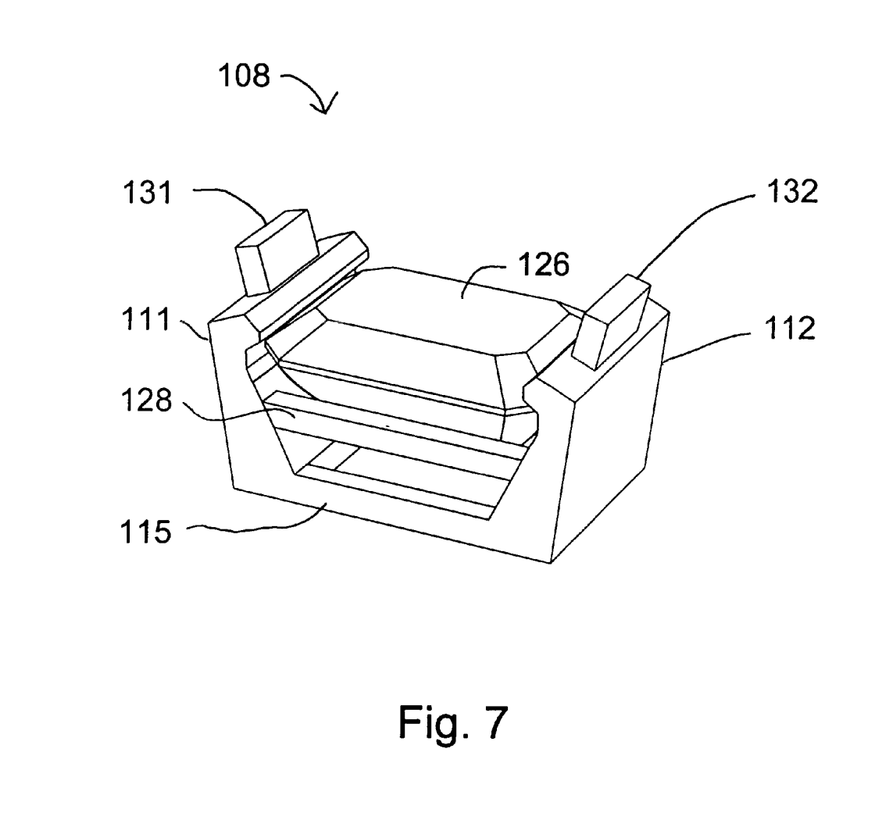
FIG. 7 is a perspective view of the setting of FIG. 6, with a gemstone in the setting and the prongs engaging the gemstone.

FIG. 6 is a perspective view of a setting 108 constructed in accordance with an alternate aspect of the present invention. A pair of prongs 111, 112 extend from a base 115. This can provide full support for a gemstone, or further structure can be used to augment this support. FIG. 7 is a perspective view of the setting 108 of FIG. 6, with a gemstone 126 in the setting and the prongs 111, 112 engaging the gemstone. In addition to the prongs 111, 112, lateral members 128, 129 provide additional support for the gemstone 126, so that the gemstone 126 remains securely in the setting 108. The prongs 111, 112 each have free end extensions 131, 132. It can be seen that the closing of the prongs 111, 112 against the gemstone 126 can be accomplished by grabbing extensions 131, 132 as described above in connection with prongs 21–24, extensions 31–34 and tool 71.

Figure 8:
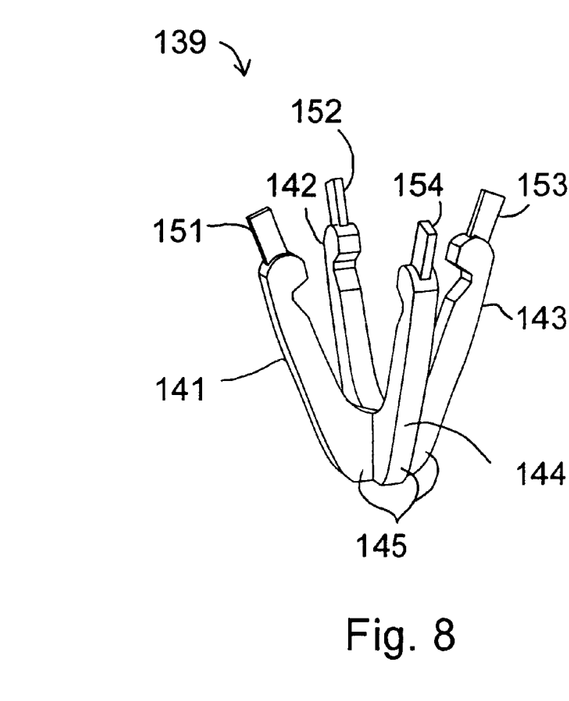
FIGS. 8 and 9 are perspective views of a setting in which the prongs are cantilever mounted from the base.
Figure 9:
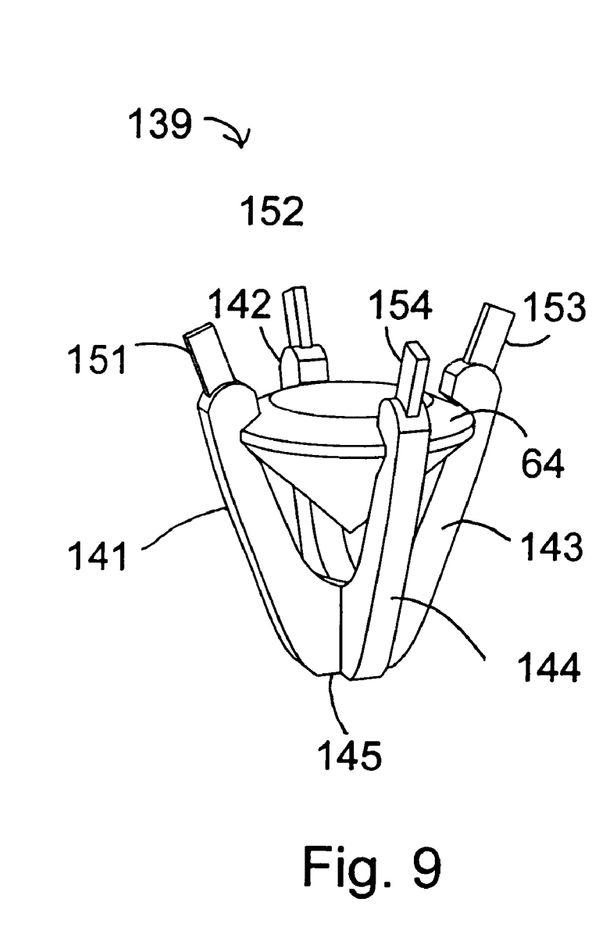
Figure 10:
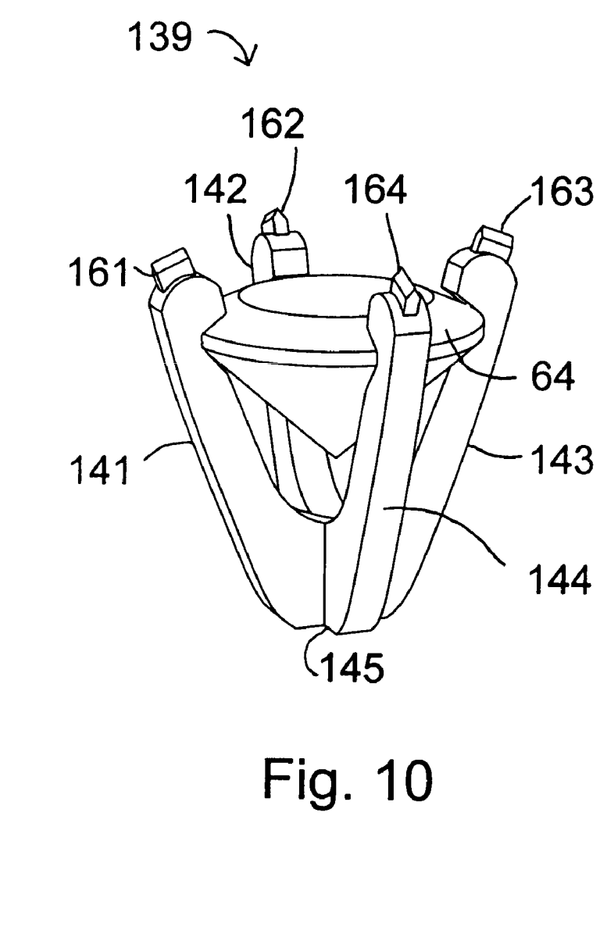
FIG. 10 is a perspective view of the setting, after prong extensions are cut and polished in accordance with the present invention.

FIGS. 8 and 9 are perspective views of a setting 139 in which prongs 141–144 are cantilever mounted from a base 145. The prongs 141–144 are initially fabricated with extensions 151–154. In order to assemble the setting 139, the worker inserts the gem 64 into place. The worker then applies the tool 71 to one or more of the prongs 141–144 at the respective extensions 151–154 and gently twists the prong 141–144 in controlled manner into place. The tool 71 may be a torque-measuring or torque-limiting device to control the pressure applied to the gemstone 64 by the prong 141–144, thus limiting breakage of the gem 64. The worker then applies the torque to another of the extensions 151–154 and gently twists it in controlled manner into place, and so on, until the gem is securely mounted. The extensions 151–154 are then removed from each prong 141–144 by cutting and/or grinding them away, and the surface of each prong 141–144 is then polished to provide the smooth ends 161–164 shown in FIG. 10. FIG. 10 is a perspective view of the setting 139, after the prong extensions 151–154 are cut and polished in accordance with the present invention.

The specific number of prongs is a matter of design choice. It is common to have 3-prong settings, and 2-prong settings are possible. Settings with more than four prongs are also common. The present invention can be used with all of these. It is also possible to provide the end extensions 31–34 on some but not all of the prongs. While the tool 71 is shown as pliers, other tools capable of receiving the extensions 31–34 may be used, such as a hollow tube able to receive the extensions 31–34. While a particular method of bending the prongs 21–24 has been described, it is possible to implement the invention with other methods, such as clamping two or more prongs 21–24 together. Accordingly the invention should be limited only as defined in the claims.

What is claimed is:

1. A method for setting a gemstone comprising:
    providing at least one prong, which includes a gemstone-receiving grip which has a reduced yield strength;
    providing an extension on said at least one prong which includes the gemstone-receiving grip;
    gripping the extension with a tool and forcing the prong into a gripping relationship with a gemstone; and
    removing the extension from the prong.

2. The method of claim 1, comprising configuring the at least one prong for closing into a gripping relationship with the gemstone so that force applied to the extension effects bending of the prong.

3. The method of claim 2, comprising a notch provided in said at least one prong having the gemstone-receiving grip, the notch providing said reduced yield strength so that at least a portion of said bending occurs about the notch.

4. The method of claim 1, comprising manufacturing the prongs from a metal or alloy including as a substantial component one of silver, gold, platinum and palladium.

5. The method of claim 1, wherein four prongs, attached at a base, are cantilevered to locations at which the prongs engage the gemstone.

6. The method of claim 1, wherein two prongs, attached at a base are provided, the prongs cantilevered to locations at which the prongs engage the gemstone.

* * * * *